United States Patent [19]

Chaug et al.

[11] Patent Number: 5,350,629
[45] Date of Patent: Sep. 27, 1994

[54] MAGNETORESISTIVE DEVICE AND BARRIER FORMATION PROCESS

[75] Inventors: Yi-Shung Chaug, Boulder; Victor L. Walker; Nripendra N. Roy, both of Westminster, all of Colo.

[73] Assignee: Storage Technology Corporation, Louisville, Colo.

[21] Appl. No.: 22,679

[22] Filed: Mar. 1, 1993

[51] Int. Cl.$^5$ .............................................. G11B 5/127
[52] U.S. Cl. ..................................... 428/336; 360/113; 360/122; 428/697; 428/472; 428/701; 428/702; 428/469
[58] Field of Search ................ 360/122, 113; 428/697, 428/701, 702, 472, 469, 336

[56] References Cited

U.S. PATENT DOCUMENTS

| | | | |
|---|---|---|---|
| 3,656,229 | 4/1972 | Sakurai et al. | 360/122 |
| 4,914,538 | 4/1990 | Howard | 360/113 |
| 4,931,892 | 6/1990 | Spada | 360/113 |

OTHER PUBLICATIONS

Cannon, et al., Design and Performance of a Magnetic Head for a High-Density Tape Drive, May 1986, p. 274.

*Primary Examiner*—A. A. Turner
*Attorney, Agent, or Firm*—William J. Kubida; John R. Ley

[57] ABSTRACT

A magnetoresistive (MR) device and barrier formation process is disclosed in which a barrier layer of an aluminum-titanium oxidic compound of approximately 35 Å thickness is formed between a first alumina film and an overlying material of iron bearing content, such as nickel-iron. The aluminum-titanium oxidic compound layer serves as an etchant barrier for the alumina film in a subsequent etching process to reduce or eliminate "rosette" formation otherwise occurring when etchant is trapped within pores of a porous substrate such as ferrite, ceramic or other polycrystalline material. The barrier layer also serves as a passivation layer to prevent the surface of the underlying alumina film from being modified by the transfer of ultrasonic energy during subsequent wirebonding processing which would otherwise result in film delamination at the nickel-iron-/alumina layer interface.

4 Claims, 7 Drawing Sheets

Fig_1a
PRIOR ART

Fig_1b
PRIOR ART

Fig_2a
PRIOR ART

Fig_2b
PRIOR ART

Fig_2c PRIOR ART

Fig_3a PRIOR ART

Fig_3b PRIOR ART

Fig_3c PRIOR ART

Fig_3d PRIOR ART

Fig_4a

Fig_4b

Fig_4c

Fig_4d

Fig_4e

Fig_4f

Fig_4g

Fig_4h

*Fig_4i*

*Fig_4j*

MAGNETORESISTIVE DEVICE AND BARRIER FORMATION PROCESS

BACKGROUND OF THE INVENTION

The present invention relates to improvements in magnetoresistive (MR) devices and methods for fabricating the same. More particularly, the MR device and the method of fabricating it are of particular utility in the manufacture of MR read heads of the non-shunt bias type for use in computer mass storage devices. Even more particularly the present invention provides a barrier layer to substantially obviate the prior significant problems of film delamination and "rosette" formation during fabrication of MR devices.

The design of a shunt biased magnetic head for use in magnetic tape subsystems utilizing magnetoresistive read elements is generally described in Cannon et al., "Design and Performance of a Magnetic Head for a High-Density Tape Drive", IBM J. Res. Develop., Vol. 30, No. 3 May 1986, the disclosure of which is hereby specifically incorporated by reference. In the formation of MR heads of the non-shunt bias type, a first alumina ($Al_2O_3$—aluminum oxide) layer is generally sputter deposited on a ferrite substrate. A nickel iron (NiFe) film and a titanium (Ti) overcoat are then deposited on the alumina layer. Utilizing photolithographic techniques, appropriate device dimensions are photodefined and the structure is then ion-milled to define the head tracks. Following this step, a gap layer comprising a second layer of alumina is deposited, photo-defined and wet etched. A titanium/gold (Au) layer is then deposited on the track area as a conductive layer and interconnecting aluminum wires are ultrasonically bonded to the gold layer.

The ferrite substrate typically used in this process generally contains 5,000–6,000 pores/mm$^2$ with pore sizes which range from approximately 0.5 micrometers up to approximately 5.0 micrometers. However, the deposition of alumina, nickel-iron and titanium layers on this porous substrate does not cover all of the pores. In the gap wet-etching step, the aluminum layer is etched with an etchant such as phosphoric acid. It has been found, that some of the etchant remains trapped in the ferrite pores when the substrate is subsequently covered with the gold conductive layer. Reaction between the trapped etchant and the first alumina layer overlying the ferrite substrate generates local internal pressure which pushes the upper layer films to form bubbles. The trapped gas eventually escapes creating a tiny hole at the center. The bubbles which are formed may also thereafter collapse as a result of the escaping gas, thereby forming "rosettes". The formation of "rosettes" in the MR head track areas causes the track resistance to change and induces failure due to electro-migration. Such "rosettes" are a serious problem which becomes even more acute as track density increases on such MR heads.

Moreover, in the ultrasonic wire bonding process previously described, the alumina layer undergoes chemical changes through the transfer of ultrasonic energy. These changes promote preferential migration of iron (Fe) from the nickel-iron film toward the nickel-iron/first alumina interface. This preferential migration induces the formation of oxidic iron (FeO) at this interface. Such complex chemical mechanisms weaken the adhesion between the nickel-iron film and the first layer of alumina, which results in film delamination at this nickel-iron/alumina interface during the wire bonding step.

Both the formation of "rosettes" and the undesired ultrasonic induced film delamination affect the performance and yield of MR devices manufactured in accordance with the foregoing process. It is, therefore, highly desirable to eliminate or reduce the "rosette" formation and the ultrasonic induced film delamination at the nickel-iron/alumina interface.

Certain problems attendant to the rupture and the delamination of certain thin films in the processing and manufacture of MR devices have been recognized. U.S. Pat. No. 4,914,538 entitled "Magnetoresistive Read Transducer", issued Apr. 3, 1990 proposes the use of a thin film underlayer in conjunction with a thin film overlayer formed of material taken from the group consisting of titanium, chromium (Cr), tantalum (Ta), zirconium (Zr), hafnium (Hf) and titanium tungsten (TiW) to reduce etchant penetration and resultant delamination of tungsten (W) films. The thin film underlayer or overlayer is described as having a thickness within the range of 25–200 angstroms to prevent rupture and delamination of the relatively porous tungsten films utilized in the device described. U.S. Pat. No. 4,931,892 for "Long Life Magnetoresistive Head of the Non-Shunt Bias Type", issued on Jun. 5, 1990 advocates the use of a "sacrificial" material, such as titanium, in electrical contact with the MR element to extend the useful life of the more "noble" NiFe permalloy portions of the structure. Suggested thicknesses for the "sacrificial" material are on the order of less than 200 angstroms and materials such as titanium, tin (Sn), aluminum (Al), zirconium and chromium are described. Neither of the techniques described in the foregoing patents has provided or suggested a satisfactory solution to the undesirable formation of "rosettes" or delamination at the nickel-iron/alumina interface in the processing and manufacture of an MR element.

It is with respect to these and other considerations that the present invention has evolved.

SUMMARY OF THE INVENTION

In general, the present invention proposes the formation of a barrier on the first alumina surface of a structure used in manufacturing an MR device which is chemically inert to etchants and also remains stable during the ultrasonic wire bonding process. The barrier formation process preferably results in an approximately 35 angstrom thick aluminum-titanium oxidic compound formed on the first alumina surface. The aluminum-titanium oxidic compound acts as a barrier to prevent etchant from entering into the pores of the ferrite substrate during the second alumina layer etching step and thus eliminates or minimizes "rosette" formation. The aluminum-titanium oxidic compound also acts as a passivation layer which does not undergo chemical changes due to the application of ultrasonic energy during wire bonding and thus prevents film delamination during device subsequent processing. Forming the barrier layer is particularly useful when processing a generally porous substrate having a layer of aluminum oxide formed thereon and an iron compound layer in an overlying relationship thereto, in which case the process includes the steps of forming an aluminum-titanium oxidic compound layer on the aluminum oxide layer. The iron compound layer is then formed on the aluminum-titanium oxidic compound layer.

Another aspect of the invention relates to a thin film device having at least an aluminum oxide layer and an iron compound layer in an overlying relationship, in which an aluminum-titanium-oxidic compound layer is interposed between the aluminum oxide layer and the iron compound layer.

In accordance with another aspect of the present invention, a method of forming a thin film device involves the steps of providing a substrate and establishing a first alumina layer on a major surface thereof. An aluminum-titanium oxidic compound layer is formed on the first alumina layer and an iron compound layer is additionally established on the aluminum-titanium oxidic compound layer. A first titanium layer is additionally formed on the iron compound layer and portions of the titanium and iron compound layers are selectively removed to define an aperture or gap, therein. A second alumina layer is established within the gap and a conductive layer overlying the first titanium layer surrounding the second alumina layer is thereafter formed.

The features and objects of the present invention and the manner of attaining them will become more apparent and the invention itself will be best understood by reference to the following description of a preferred embodiment thereof taken in conjunction with the accompanying drawings.

BRIEF DESCRIPTION OF THE DRAWINGS

FIGS. 4a-4j also show the process flow for constructing a magnetoresistive read head of the non-shunt bias type.

DETAILED DESCRIPTION

Figure 1A:
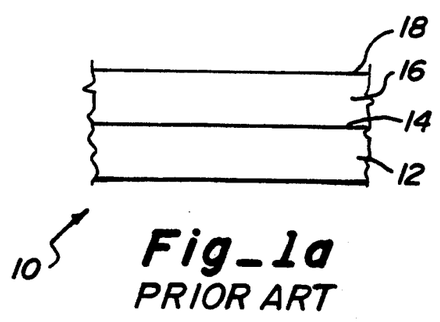
FIGS. 1a and 1b are simplified, partial, cross-sectional views illustrative of a prior art thin-film structure and process flow sequence in which, for example, an aluminum oxide (or alumina) layer overlies a porous substrate (such as ferrite) and upon which an iron compound, magnetoresistive layer (such as NiFe) is formed with a titanium overcoat.

With reference to FIG. 1a, a prior art structure 10 is shown. The prior art structure 10 comprises a substrate 12 presenting a porous surface 14 upon which a first alumina layer 16 is deposited or formed. The first alumina layer 16 presents an alumina surface 18 as shown.

The substrate 12 may be conveniently formed of ferrite, ceramic or other polycrystalline materials. Typically, when using a ferrite substrate 12, the substrate contains 5,000–6,000 pores/mm$^2$ with pore sizes varying from less than 0.5 micrometers up to approximately 5.0 micrometers. The first alumina layer 16 may vary from 1,400 angstroms to 1,800 angstroms in thickness. However, the deposited first alumina layer 16 does not adequately cover the pores on porous surface 14 of substrate 12 which can lead to the trapping of etchant within the pores as will be more fully described hereinafter.

Figure 1B:
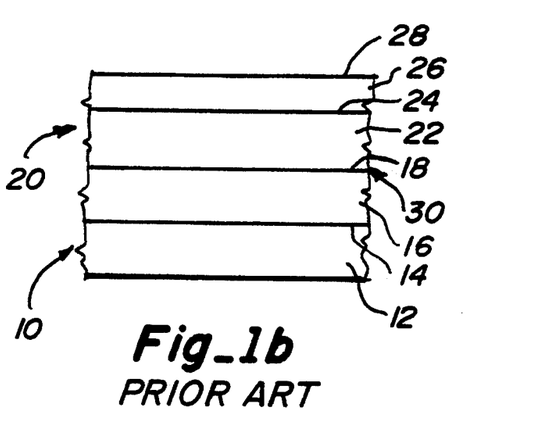

Referring additionally now to FIG. 1b, the prior art structure 10 of FIG. 1a is shown with an additional structure 20 added thereto. The additional structure 20 comprises a nickel-iron (NiFe) film 22 deposited upon the alumina surface 18 of the structure 10. The nickel-iron film 22 presents a NiFe surface 24 upon which there is deposited a first titanium (Ti) film 26 presenting a first Ti surface 28.

The nickel-iron film 22 forms the MR element of the device to be described more fully hereinafter. The nickel-iron film 22 is preferably deposited to a thickness of between 680 angstroms to 800 angstroms while the first titanium film 26 may preferably be on the order of 200 angstroms thick. The deposited nickel-iron film 22 also does not adequately cover first alumina layer 16 which is adjacent to the pores on porous surface 14 of substrate 12, allowing the etchant to enter and become trapped within such pores. The nickel-iron film 22 is also etchable in phosphoric acid while the titanium of the first titanium film 26 is not etchable in the acid. The first titanium film 26 deposited on top of the nickel-iron film 22 acts as a barrier to prevent the NiFe material from etching in the subsequent etching process of the second gap layer of alumina as will be more fully described hereinafter.

Figure 2A:
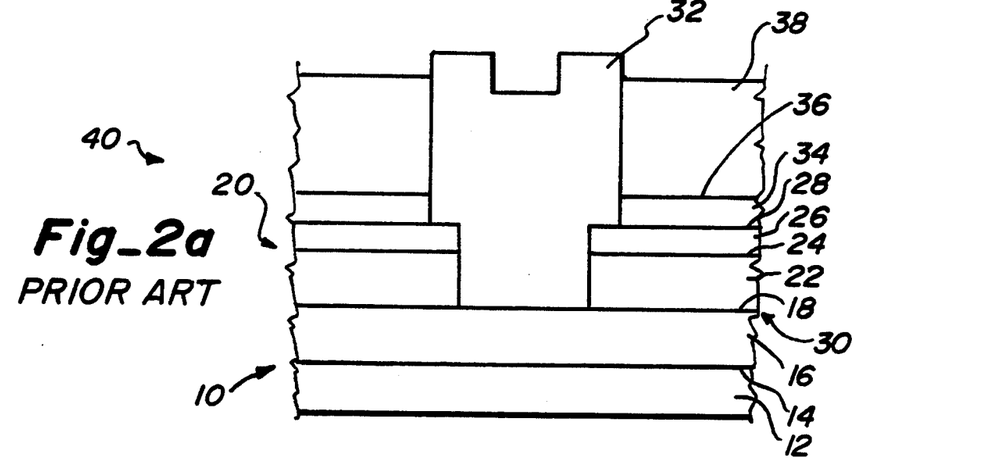
FIG. 2a is a simplified, partial, cross-sectional view illustrative of the prior art thin-film device structure of FIGS. 1a and 1b, showing an additional alumina gap layer formed within an aperture defined in a first titanium layer and the iron compound layer and utilizing, for example, a second titanium layer and a gold layer as a conductive layer.
Figure 2B:
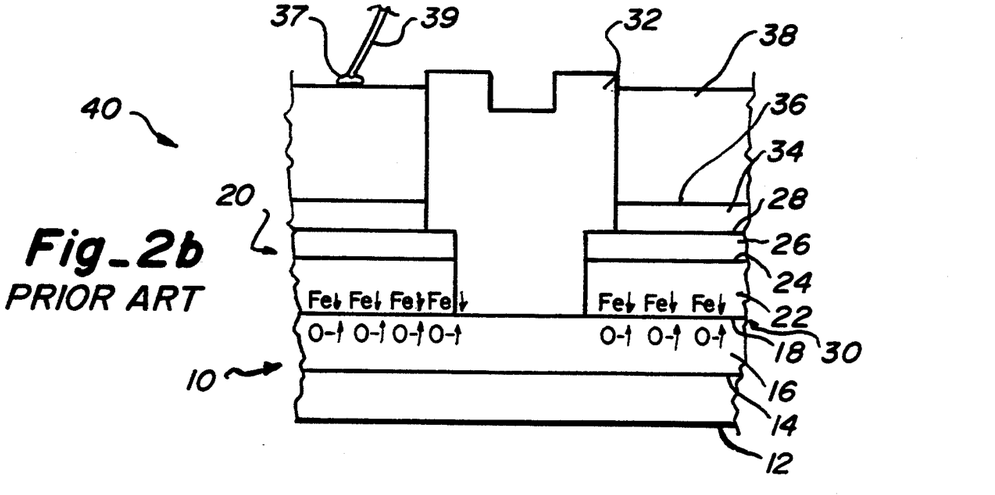
FIG. 2b is a follow on, simplified, partial, cross-sectional view of the prior art thin film device of FIG. 2a, illustrating the attachment of a conductive wire to the conductive layer by means of, for example, an ultrasonic wire bonding process, and further illustrating the preferential migration of iron from the nickel-iron film toward the nickel-iron/first alumina layer interface to form iron oxide (FeO) thereat, to result in film delamination during the wire bonding process.
Figure 2C:
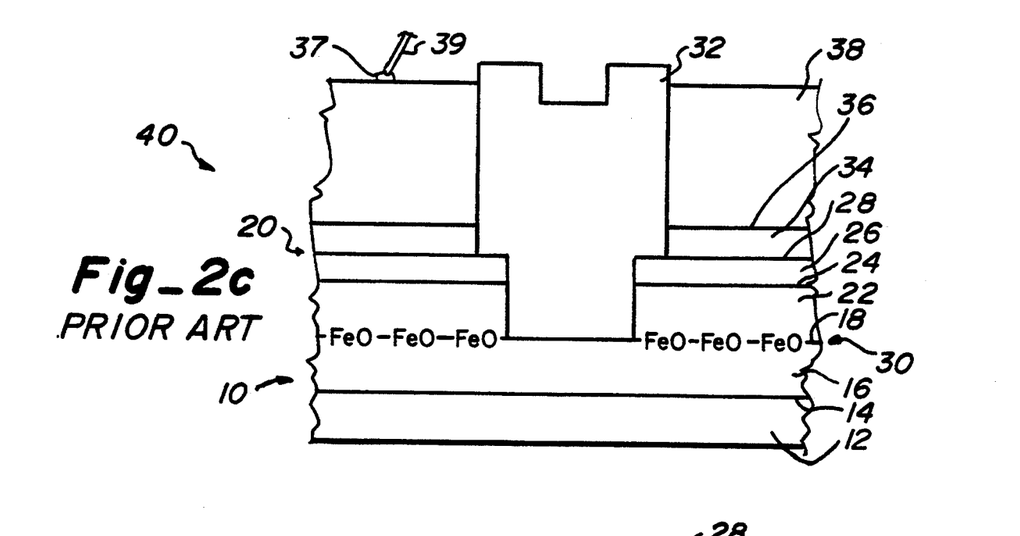
FIG. 2c is an additional follow on, simplified, partial, cross-sectional view of the prior art thin film device of FIG. 2b showing the formation of an iron oxide region at the nickel-iron/alumina interface due to the transfer of ultrasonic energy in the wire bonding process.
Figure 3A:
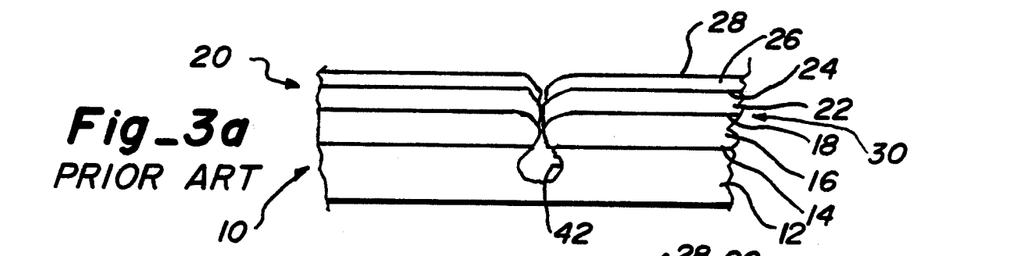
FIGS. 3a-3d are simplified, partial, cross-sectional views illustrative of the prior art thin film device structure of FIGS. 1a, 1b and FIGS. 2a-2c in which a pore within the porous substrate is shown in FIG. 3a, which pore traps an etchant during a subsequent etching of the second alumina layer due to the inadequate coverage of the first alumina and iron compound layers as shown in FIG. 3b, allowing the etchant to cause a bubble to be formed in the layers overlying the pore as shown in FIG. 3c which collapses in the region overlying the pore to form a "rosette" as shown in FIG. 3d.
Figure 3B:
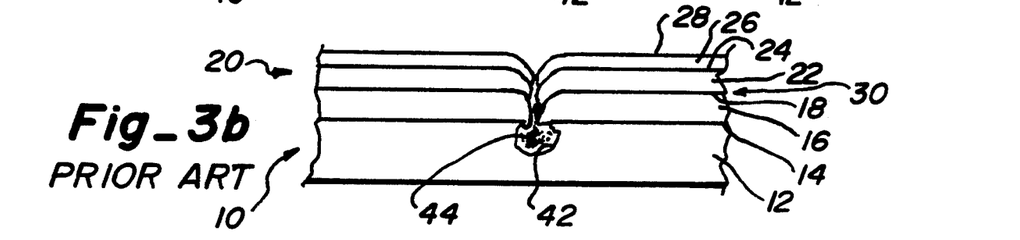
Figure 3C:
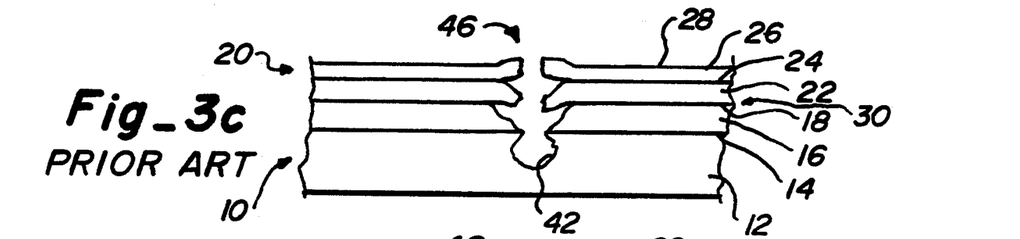
Figure 3D:
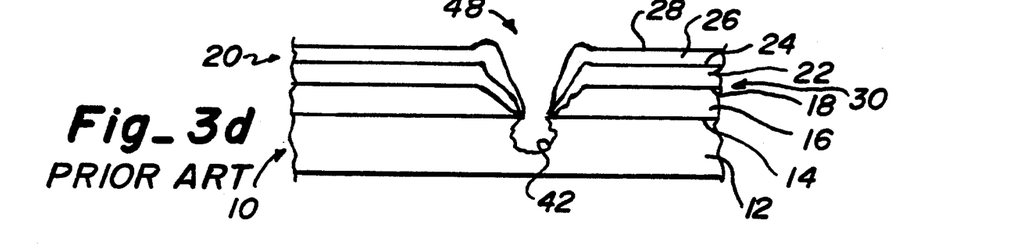

Referring additionally now to FIGS. 2a, 2b and 2c, a magnetoresistive (MR) head 40 is shown. The magnetoresistive head 40 is shown constructed upon the structure 10 and the additional structure 20. For purposes of describing the problems attendant the structure and processing of magnetoresistive head 40, an interface 30 is defined as the intersection between the alumina surface 18 of the first alumina layer 16 and the nickel-iron film 22.

A second alumina layer 32 is patterned onto and formed within the additional structure 20 in a gap region of magnetoresistive head 40. The second lumina layer 32 contacts the first alumina layer 16 within the gap region. The gap region is formed by photolithographic means within additional structure 20. Following photo definition of the gap region, the first titanium film 26 and the nickel-iron film 22 are ion milled to form the gap region. The second alumina layer 32 may be approximately 6,800 angstroms to 9,300 angstroms in thickness depending on the uses to which the MR head 40 will be put. Process control of the deposition for second alumina layer 32 is such that its etching rate in phosphoric acid is approximately two times that of the first alumina layer 16.

A second titanium film 34 is deposited on the first Ti surface 28. The second titanium film 34 presents a second Ti surface 36 upon which is further deposited a gold (Au) film 38. The conductive layer comprising the second titanium film 34 and gold film 38 are photolithographically defined. Thereafter, phosphoric acid etching of second alumina layer 32 takes place within the gap of region of the MR head 40. In this etching step, etchant is trapped within the pores of substrate 12 due to the relatively poor coverage of these local areas by the nickel-iron film 22 and first alumina layer 16.

In the deposition of the conductive layer comprising the second titanium film 34 in conjunction with the gold film 38, typical thicknesses are approximately 5,000 angstroms for the gold film 38 and approximately 200 angstroms for the second titanium film 34. The 200 angstrom thick titanium deposition of the second titanium film 34 prior to the deposition of the gold film 38 enhances film adhesion. During the deposition process, the substrate 12 is heated to 90° celsius. This temperature is, unfortunately, also favorable for inducing a reaction between the trapped phosphoric acid etchant and the first alumina layer 16. The problems attendant to this trapped etchant will be more fully described hereinafter.

Referring now specifically to FIGS. 2b and 2c, ultrasonic bonding of a wire 39 to the gold film 38 by means of a bond 37 is shown. The wire 39, which may comprise aluminum, is ultrasonically bonded to the gold film 38 as necessary to effectuate the bond. Concurrently, ultrasonic energy is transferred from the transducer of the wire bonder to the underlying alumina surface 18 of the first alumina layer 16, and that ultrasonic energy induces changes within the first alumina layer 16 at the interface 30 with the nickel-iron film 22. These changes promote preferential migration of iron from the nickel-iron film 22 toward the interface 30 to form iron oxide and unintentionally increase the volume of the interface 30. Such complex mechanisms weaken the adhesion at the interface 30 between the nickel-iron film 22 and the first alumina layer 16 resulting in film delamination at the interface 30 as a typical and unintended consequence of the wire bonding step.

Referring additionally now to FIGS. 3a-3d, an illustration of the difficulties encountered when the etchant is trapped within the pores of substrate 12 is shown. In the description of the structure illustrated in FIGS. 3a-3d, like structure to that above described with respect to FIGS. 1a-1b and 2a-2c is like numbered and the foregoing description thereof shall suffice herefor.

As illustrated in FIGS. 3a-3d, the substrate 12 contains a number of pores varying in size from approximately less than 0.5 micrometers to approximately 5.0 micrometers. An example of such, a single pore 42, is shown. As previously described, phosphoric acid etching of the gap region necessary to deposit the second alumina layer 32 (as shown in FIGS. 2a-2c), leaves some phosphoric acid, or other etchant 44 within the pore 42. During the deposition of second titanium film 34 (as shown in FIGS. 2a-2c), the substrate 12 is heated to 90° celsius. This temperature is also favorable for initiating a chemical reaction between the trapped etchant 44 and the first alumina layer 16. Such reaction generates local internal pressure which pushes the upper layer of the overlying films to form bubbles in the region 46. The gas contained in the bubbles eventually escapes creating a tiny hole at the center of the bubble, whereupon the bubble collapses as a result of the escape of the gas. The collapsed bubble in the region 46 creates a rosette 48. The formation of rosettes 48 in the track areas of an MR head undesirably alters the track resistance and induces failure due to electromigration.

It has been discovered that, in order to reduce or eliminate rosette 48 formation and the ultrasonically induced film delamination at the interface 30 between the nickel-iron film 22 and the first alumina layer 16, the formation of a barrier on the alumina surface 18 of the first alumina layer 16 at the interface 30 must be established. The barrier must be relatively chemically inert to etchants used in the thin film device processes and also remain stable under ultrasonic wire bonding conditions.

Figure 4A:
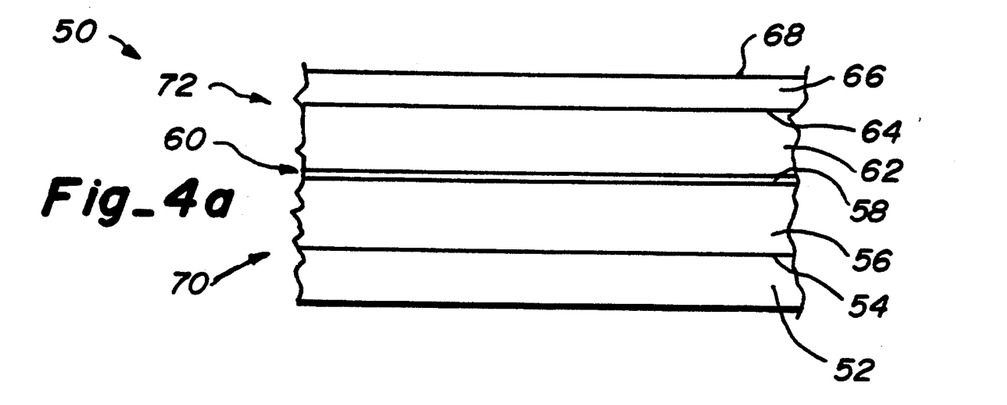
FIGS. 4a-4j are partial, cross-sectional views illustrative of a magnetoresistive device and barrier formation process in accordance with the present invention in which an aluminum-titanium oxidic compound layer is preferentially formed at the interface of the first alumina layer/iron compound layer interface to serve as both an etching barrier for the first alumina layer during the gap etching step of the second alumina layer to prevent "rosette" formation and as a passivation layer to prevent the first alumina surface from being modified by the transfer of ultrasonic energy in the wire bonding process to thereby reduce the film delamination at the first alumina layer/iron compound layer interface.

Referring now to FIG. 4a, an improved structure 50 for fabrication of an MR transducer or head, is shown. The improved structure 50 comprises a substrate 52 presenting a porous surface 54 upon which is deposited a first alumina layer 56. The first alumina layer 56 presents a first alumina surface 58. The substrate 52, which may be ferrite, ceramic or other polycrystalline material generally has between 5,000 to 6,000 pores/mm² on the porous surface 54 if ferrite is used. The first alumina layer 56, which may be between 1,400 to 1,800 angstroms in thickness, does not adequately cover the pores of the porous surface 54 to prevent etchant utilized in subsequent processing steps from entering the pores and becoming trapped.

Upon the first alumina surface 58 of the first alumina layer 56, a barrier layer 60 is formed in a manner which will be more fully described hereinafter. The barrier layer 60 comprises an aluminum-titanium oxidic compound ($Al_xTi_yO_z$) and has a thickness of less than 100 angstroms, preferably on the order of approximately 35 angstroms. Overlying the barrier layer 60, a nickel-iron film 62 is deposited presenting a NiFe surface 64. A first titanium film 66 is then further deposited on the NiFe surface 64 presenting a first Ti surface 68. The combination of the substrate 52 with the first alumina layer 56 is shown to be a first structure 70 while the combination of the nickel-iron film 62 and the first titanium film 66 comprises a second structure 72 separated by a barrier layer 60.

The nickel-iron film 62 and the first titanium film 66 of the structure 72 are generally deposited in a sputter-deposition system in which the barrier layer 60 is simultaneously formed. The tooling and the chamber wall of the sputter-deposition system used in the fabrication of an MR head in accordance with the present invention become coated over time with an alternate layer of titanium, nickel-iron, titanium, nickel-iron etc. In this manner, titanium always remains at the top layer of the chamber wall and on the tooling surface at the end of each cycle of the titanium/nickel-iron deposition process. Prior to the deposition of nickel-iron film 62, a pre-sputter etching of first alumina surface 58 is performed in the sputter-deposition system where a DC bias is applied to the tooling surface as well as the first alumina surface 58. The sputtered species from the tooling are then redeposited onto the first alumina surface 58 which is also simultaneously sputter etched by sputtering gas. Under the controlled process parameters of this pre-sputter etching step, the redeposition of titanium on the first alumina surface 58 will occur. During the sputter etching of the first alumina surface 58, oxygen is preferentially sputtered away from the first alumina surface 58 resulting in the formation of an unstable aluminum sub-oxide which promotes the reactions which take place between the redeposited titanium and the sputtered alumina surface 58 to form the barrier layer 60. This reaction results in the formation of the aluminum-titanium oxidic compound of the layer 60 with a thickness of less than 100 angstroms and preferably approximately 35 angstroms, on the first alumina surface 58.

This aluminum-titanium oxidic compound of the layer 60 is not etchable in phosphoric acid and does not chemically change upon application of ultrasonic energy in a subsequent wire bonding step. The presence of the aluminum-titanium oxidic compound barrier layer 60 at the interface between the nickel-iron film 62 and the first alumina layer 56 acts as both an etching barrier for first alumina layer 56 during the gap region etching process (thus preventing "rosette" formation), and also as a passivation layer to prevent the first alumina surface 58 from being modified by the effect of ultrasonic energy applied in the subsequent wire bonding process (thus reducing film delamination at the interface between the nickel-iron film 62 and the first alumina layer 56). As will be more fully described hereinafter, additional methods for forming an aluminum-titanium oxidic compound barrier layer 60 may be used which are similarly effective in preventing rosette formation and establishing a passivation layer between nickel-iron film 62 and first alumina layer 56.

Figure 4B:
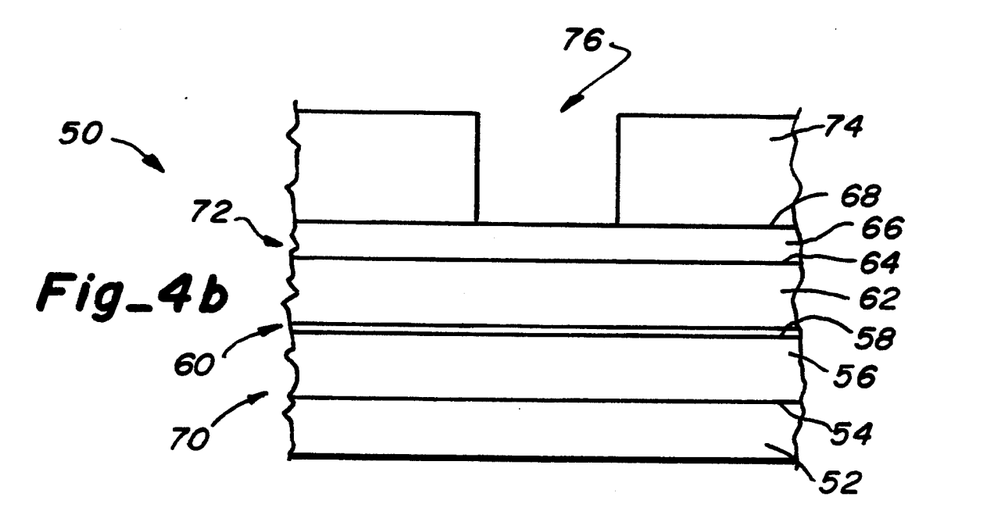

Referring additionally now to FIG. 4b, subsequent processing steps for the improved structure 50 are shown. Photoresist 74 is patterned upon the first Ti surface 68 to form the gap region 76. Depending on the desired structure for the MR head manufactured in accordance with the present invention, the width of the gap region 76 established between the patterned photoresist 74 may vary between 200 to 430 micrometers.

Figure 4C:
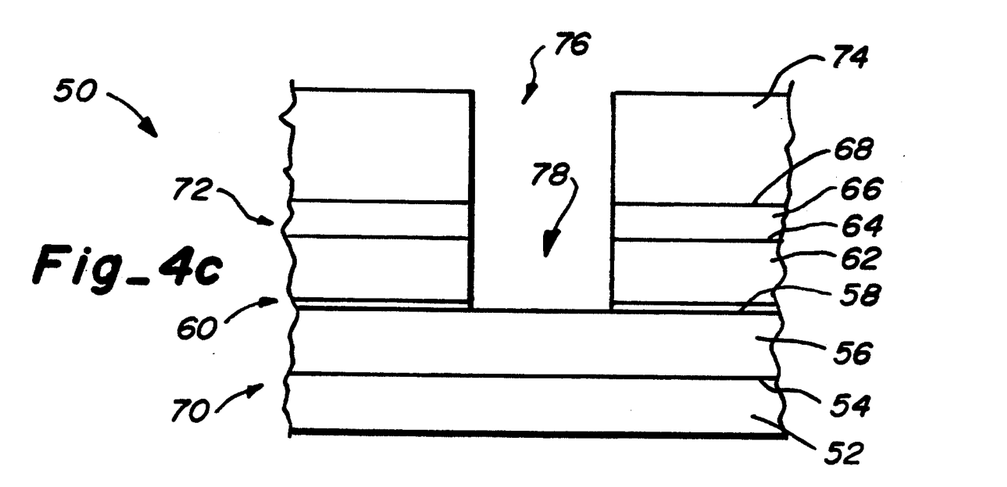
Figure 4D:
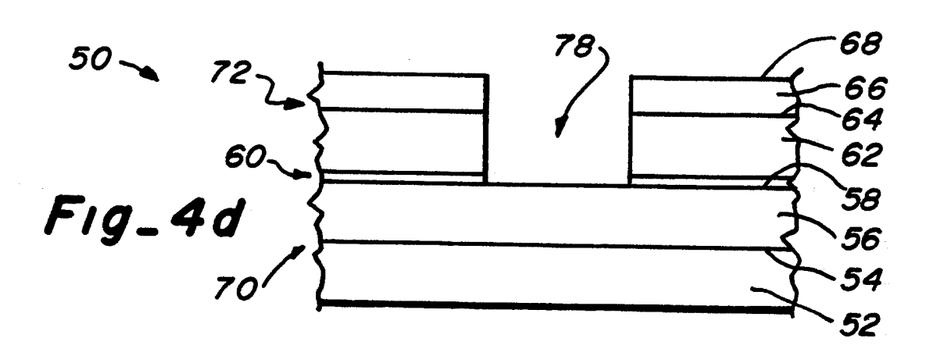

Referring additionally now to FIG. 4c, a subsequent processing step is shown. Portions of the first titanium film 66 and the nickel-iron film 62 are removed within the gap region 76 to form an aperture, or gap 78 through the second structure 52a shown. The gap 78 may be formed by ion milling of the combined nickel-iron film 62 and overlying first titanium film 66 to essentially expose the first alumina surface 58 of the first alumina layer 56 within the gap 78. As shown in FIG. 4d, the photoresist 74 is then stripped away leaving the first Ti surface 68 of the first titanium film 66 exposed.

Figure 4E:
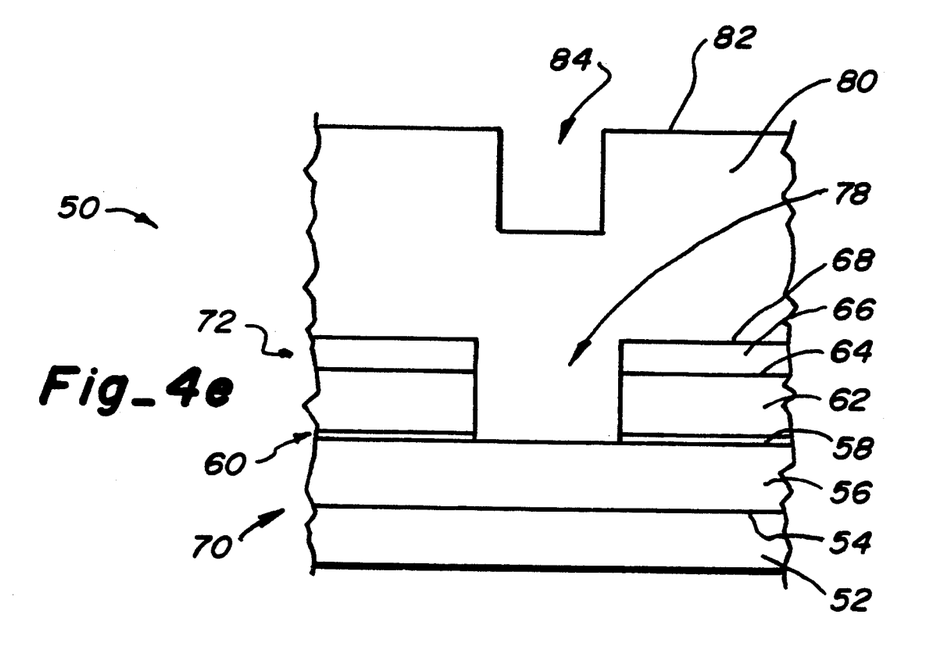

Referring additionally now to FIG. 4e, subsequent processing results in a second alumina layer 80 being deposited upon the first Ti surface 68 as well as the first alumina surface 58 of first alumina layer 56 within the gap 78. The second alumina layer 80 presents a second alumina surface 82 having a recess 84 therein in the area overlying gap 78. The second alumina layer 80 which may have a thickness of between 6,800–9,300 angstroms. The recess 84 is formed by a controlled deposition such that the etching rate of the second alumina layer 80 by phosphoric acid when forming the recess 84 is approximately two times that of first alumina layer 56.

Figure 4F:
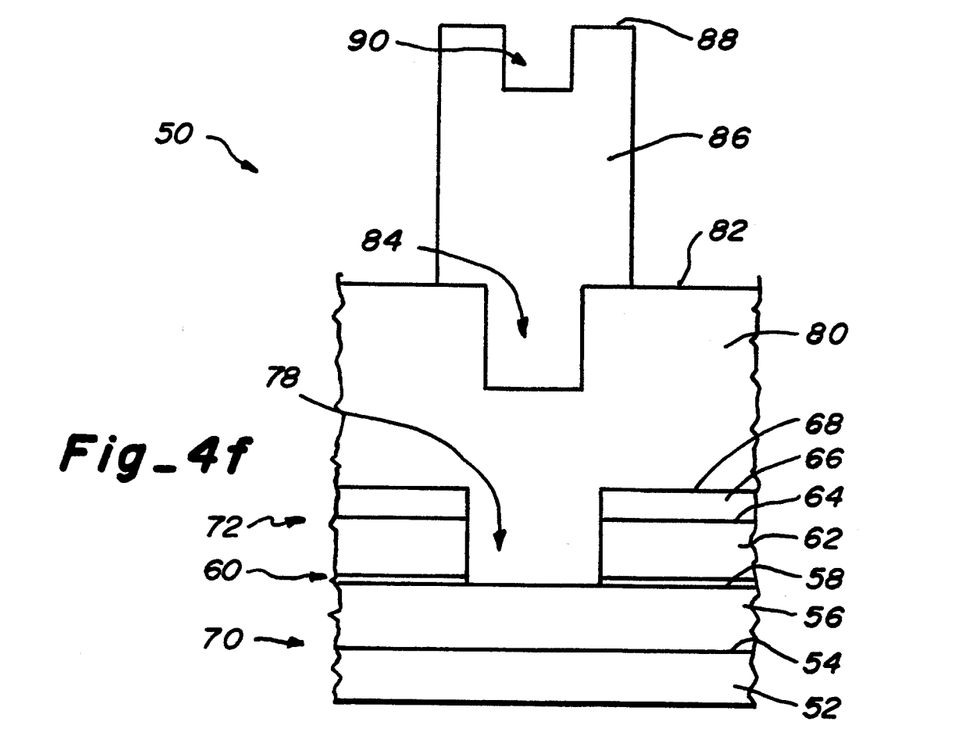

Referring additionally now to FIG. 4f, an additional photolithography step is shown in which photoresist 86 is patterned upon the second alumina surface 82 of the second alumina layer 80 and in the recess 84 thereof. Patterning photoresist 86 above the recess 84 of the second alumina layer 80 results in the formation of an opening 90 within the photoresist surface 88.

Figure 4G:
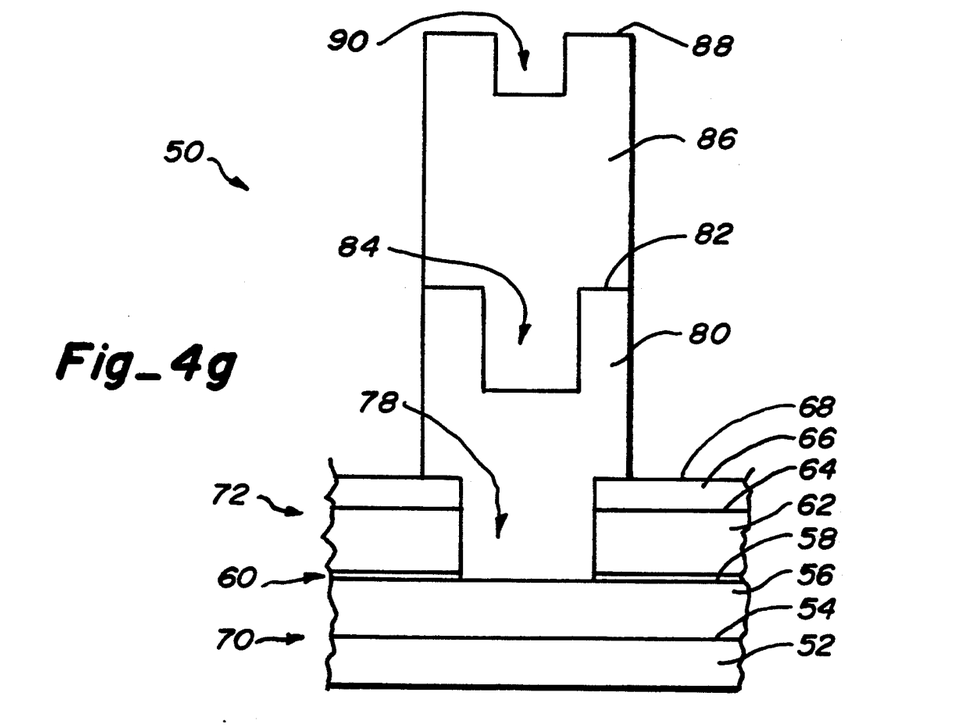

Referring additionally now to FIG. 4g in comparison to FIG. 4f, phosphoric acid etching of the second alumina layer 80 takes place. In this process step, the second alumina layer 80 is etched in phosphoric acid. As shown, the second alumina layer 80 is etched such that the first Ti surface 68 of the first titanium film 66 is exposed substantially surrounding gap 78. In this etching step, etchant will be trapped in the pores of substrate 52 due to the inadequate coverage by the first alumina layer 56 and the nickel-iron film 62.

Figure 4H:
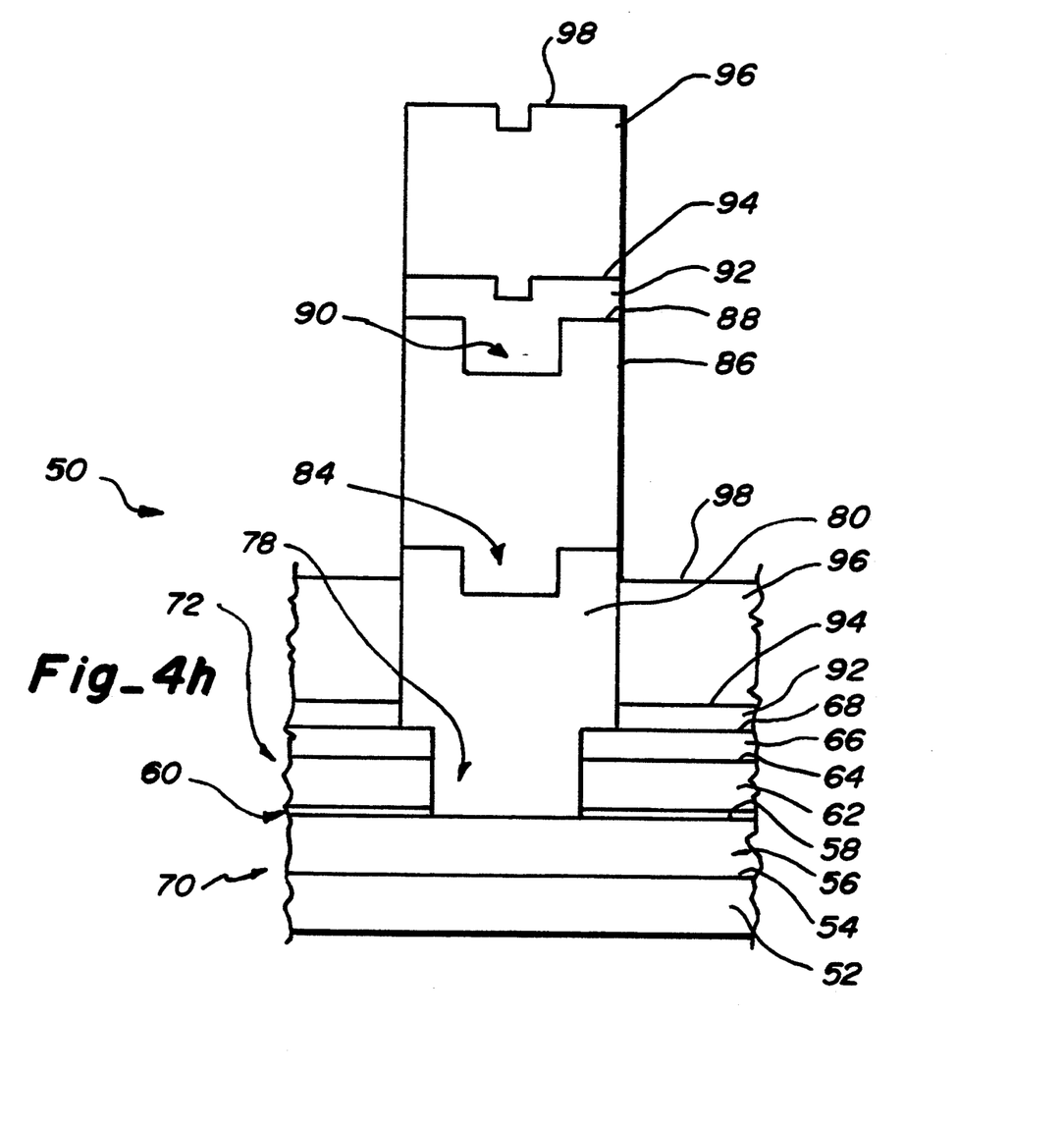

With reference now to FIG. 4h, a conductive layer of the improved structure 50 is added. A second titanium film 92, preferably of approximately 200 angstroms in thickness, is deposited upon the first Ti surface 68 of the first titanium film 66. As shown, the second titanium film 92 also overlies the photoresist 86 at the photoresist surface 88 and the opening 90 therein.

The second titanium film 92 presents a second Ti surface 94 upon which is preferably deposited an approximately 5,000 angstrom thick gold film 96. The gold film 96 presents a gold surface 98 thereof. The gold film 96 also overlies the second titanium film 92 at the second Ti surface 94 overlying photoresist 86 as shown.

The 200 angstrom thick second titanium film 92 deposited prior to the deposition of the gold film 96 is utilized to enhance the film adhesion to the first Ti surface 68 of the first titanium film 66. During the deposition process, the substrate is heated as previously described to approximately 90° celsius.

Figure 4I:
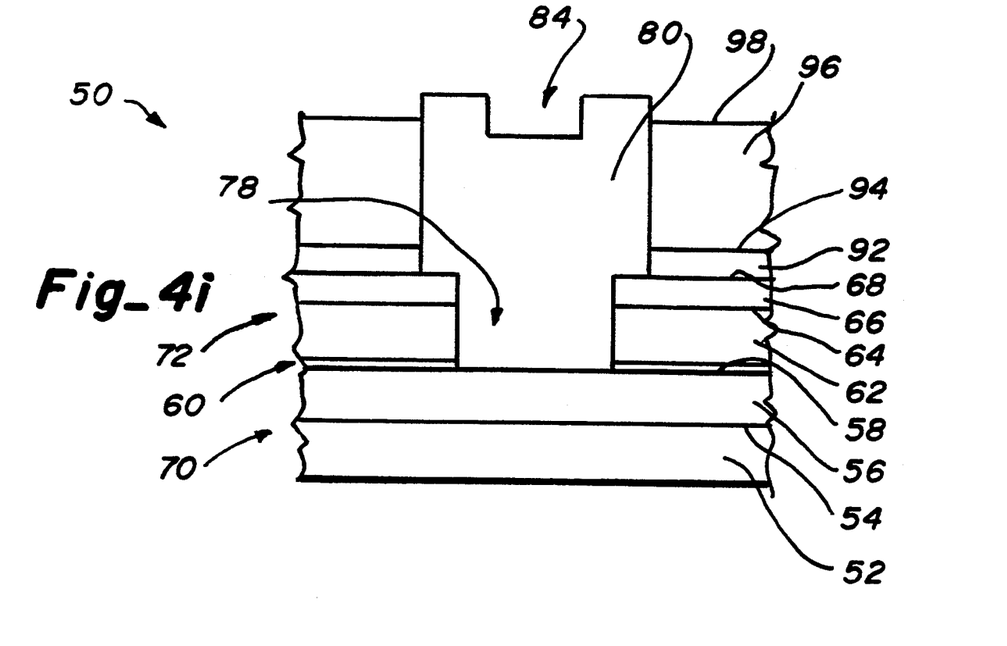
Figure 4J:
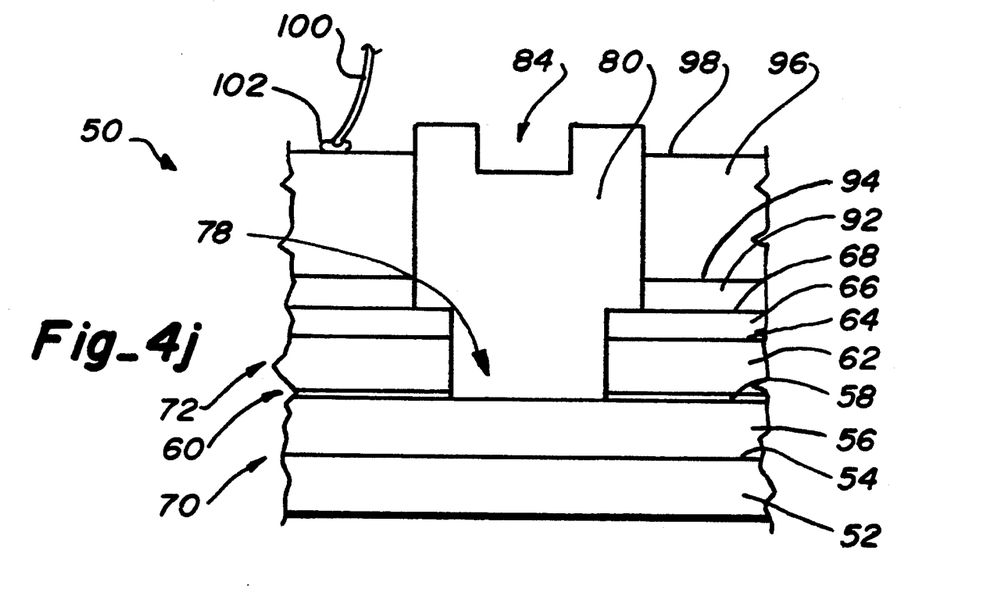

Referring additionally now to FIGS. 4i and 4j, the photoresist 86 is removed (as shown in FIG. 4h) and with it those portions of the second titanium film 92 and the gold film 96 lying thereover. A wire 100, which may comprise aluminum, is thereafter ultrasonically attached to the gold surface 98 of the gold film 96, forming a bond 102.

By means of aluminum-titanium oxidic compound barrier layer 60 formed between first alumina layer 56 and nickel-iron film 62, undesired "rosette" formation and film delamination is significantly reduced and/or eliminated. The barrier layer 60 may be produced in the manner previously described, or, alternatively, by deposition of a film with an iron content on the first alumina surface 58 of the first alumina layer 56. Prior to such film deposition, the first alumina surface 58 is sputter etched and a thin film of titanium, approximately 35 angstroms thick would then be sputter deposited or evaporated onto the sputter etched alumina surface.

Alternatively, the barrier layer 60 may be produced using reactive sputter-deposition processes to build a layer of aluminum-titanium oxidic compound on a non-alumina surface. In this process two target materials, aluminum and titanium, would be co-deposited with an argon gas (or other noble gas) having a predetermined oxygen content (approximately 5%). Utilizing such controlled process parameters and the proper target composition, an aluminum-titanium oxidic compound forming the barrier layer 60 may be formed at the first alumina surface 58.

The barrier layer 60 of the improved structure 50 of the present invention will also find application in the processing and manufacture of thin film devices utilizing ferrite, ceramic or similar substrate materials having pores therein. The aluminum-titanium oxidic compound layer 60 is particularly useful in the manufacture of thin film devices where there is presented an interface between an alumina layer and a material with an iron content such as nickel-iron film 62.

While there have been described above the principals of the present invention in conjunction with a specific apparatus, it is to be clearly understood that the foregoing description is made only by way of example and not as a limitation to the scope of the invention.

What is claimed:

1. In a thin film device having at least one aluminum oxide layer and an iron compound layer in an overlying relationship thereto, an improvement in combination therewith comprising:
    an aluminum-titanium oxidic compound layer interposed between said aluminum oxide layer and said iron compound layer, wherein said aluminum oxide layer and said aluminum titanium oxide compound layer are chemically different.

2. The thin film device of claim 1 wherein said aluminum-titanium oxidic compound layer has a thickness of 100 Å or less.

3. The thin film device of claim 1 wherein said aluminum-titanium oxidic compound layer has a thickness of substantially 35 Å.

4. The thin film device of claim 1 wherein the device is an MR device.

* * * * *